United States Patent [19]

Sakai et al.

[11] Patent Number: 4,761,757
[45] Date of Patent: Aug. 2, 1988

[54] CARRY-SAVE-ADDER THREE BINARY DIVIDING APPARATUS

[75] Inventors: Tatsuya Sakai; Sakou Ishikawa, both of Hadano, Japan

[73] Assignee: Hitachi, Ltd., Tokyo, Japan

[21] Appl. No.: 818,687

[22] Filed: Jan. 14, 1986

[30] Foreign Application Priority Data

Jan. 18, 1985 [JP] Japan .................................. 60-5669

[51] Int. Cl.$^4$ .............................................. G06F 7/52
[52] U.S. Cl. ...................................................... 364/761
[58] Field of Search ................................. 364/761, 764

[56] References Cited

U.S. PATENT DOCUMENTS 4,084,254 4/1978 Birney et al. ...................... 364/766

FOREIGN PATENT DOCUMENTS 44-17188 7/1969 Japan .
60-201435 11/1985 Japan .................................. 364/761

OTHER PUBLICATIONS

Tan, "*Uniform 2 Bits Quotients Binary Division by Carry-Save Adders*", IBM Tech. Disclosure Bull., vol. 14, No. 11, Apr. 1972, pp. 3279-3281.
Bratun et al., "*Multiply/Divide Unit for a High-Performance Digital Computer*", IBM Tech. Disclosure Bull., vol. 14, No. 6, Nov. 1971, pp. 1813-1816.

*Primary Examiner*—Gary V. Harkcom
*Assistant Examiner*—Tan V. Mai
*Attorney, Agent, or Firm*—Antonelli, Terry & Wands

[57] ABSTRACT

A high-speed dividing apparatus includes first and second carry-save adders and a half carry-save adder and the outputs of the first carry-save adder are connected to the inputs of the second carry-save adder and half carry-save adder. The first carry-save adder is capable of carrying out either the addition or the subtraction of the divisor. The second carry-save adder is adapted to carry out the subtraction of a divisor, and the half carry-save adder the addition thereof. The first and second carry-save adders generate half-sums and half-carries, and the half carry-save adder generates a half-carry. A half-sum of the divisor addition is obtained by inverting the half-sum of the second carry-save adder by an inverter. A pair of half-sum and half-carry is supplied to each of carry look-ahead logics. A carry look-ahead logic is connected to each adder. A quotient determining logic is adapted to determine quotient bits in response to outputs from carry-save adder and half carry-save adder and carry look-ahead logics. A selector control logic controls a selector in accordance with the quotient such that one of the pairs of the half-sums and half-carries of the divisor addition and divisor subtraction, and either the divisor or its inversion are supplied to the first carry-save adder. An arbitrary number of stages can be arranged in a binary tree configuration in the same manner.

5 Claims, 3 Drawing Sheets

FIG. 3

| QUOTIENT | | CSA 1 INPUT | | | |
|---|---|---|---|---|---|
| D1 | D2 | X | Y | | Z |
| 0 | 0 | $\overline{HSS'}$ | HCA' | 0 | DR |
| 0 | 1 | $\overline{HSS'}$ | HCA' | 1 | $\overline{DR}$ |
| 1 | 0 | HSS' | HCS' | 0 | DR |
| 1 | 1 | HSS' | HCS' | 1 | $\overline{DR}$ |

HCA', HCS', HSS' : HCA, HCS, HSS SHIFTED 1 BIT LEFT
$\overline{HSS'}$, $\overline{DR}$ : 1'S COMPLEMENT OF HSS', DR

FIG. 4

| $C_i$ | $HC_O^*$ | $C_O^*$ | D |
|---|---|---|---|
| 0 | 0 | 0 | 0 |
| 0 | 0 | 1 | 1 |
| 0 | 1 | 0 | 1 |
| 1 | 0 | 1 | 0 |
| 1 | 1 | 0 | 0 |
| 1 | 1 | 1 | 1 |

$D = \overline{C_i} \cdot (HC_O^* + C_O^*) + C_i \cdot HC_O^* \cdot C_O$

CARRY-SAVE-ADDER THREE BINARY DIVIDING APPARATUS

CROSS-REFERENCE TO RELATED APPLICATION

The present application relates to subject matter described in application Ser. No. 686,657 filed on Dec. 28, 1984 by Tatsuya Sakai and Sako Ishikawa, and assigned to the assignee of the present application.

BACKGROUND OF THE INVENTION

This invention relates to a dividing apparatus, and more particularly to a high-speed dividing apparatus for electronic digital computers.

A conventional basic binary dividing apparatus generates a quotient bit by bit while a divisor is added to or subtracted from a dividend or a partial remainder repeatedly in accordance with the non-restoring algorithm. There is an improved apparatus which is capable of generating a plurality of quotient bits in one cycle. This apparatus is designed to shift a partial remainder, and or subtract a suitable multiple of a divisor to or from the shifted partial remainder, and, based on the resultant partial remainder, estimate a plurality of quotient bits while determining the shift length of the partial remainder in preparation for the subsequent operation. However, the drawbacks of this apparatus reside in that it is difficult to reduce the cycle time since the shift length depends upon the result of each addition or subtraction.

Another improved apparatus of this kind which is designed with a view to eliminating these drawbacks is disclosed in Japanese Patent Examined Publication No. 44-17188 (U.S. application Ser. No. 445,315). This improved apparatus is characterized in that two quotient bits can be obtained from the values of the upper three bits of both a partial remainder and a divisor with shift of a constant length. However, it requires the multiples by 0, ½, ¾, 1, and 3/2 of a divisor, and the multiple by 3/2, among others, has to be prepared prior to starting a division. It is further necessary that normalization should be done before starting a division to shift a divisor until "1" appears in the MSB (*M*ost *S*ignificant *B*it) position, and also to shift a dividend by the same number of bits. Such various kinds of preparatory operations must be carried out prior to the starting of a division, so that much time is necessarily spent in carrying out various kinds of preprocessing steps in addition to the dividing operation proper. Moreover, a selector circuit which selects an appropriate multiple of a divisor in accordance with the values of a partial remainder and a divisor is required, which leads to an increase in the amount of hardware.

Further, the above-described conventional dividing apparatuses utilize a full adder which is used for various kinds of computations other than division. Therefore, a plurality of selector circuits and various working registers are concerned in a dividiing operation. Accordingly, the total operating time for carrying out a division cannot be reduced to the level theoretically estimated.

SUMMARY OF THE INVENTION

It is an object of the present invention to provide a high speed dividing apparatus.

It is another object of the present invention to provide an improved high-speed dividing apparatus of the type which is capable of generating a plurality of quotient bits in a single cycle.

It is still another object of the present invention to increase the operational speed of a dividing apparatus of the above-mentioned type without a particular increase in either the complexity of control or the amount of hardware.

It is a further object of the present invention is to provide a high-speed dividing apparatus of the type mentioned above which does not require any pre-processing operation, such as normalization and preparation of multiples of a divisor.

It is a further object of the present invention is to provide a high-speed dividing apparatus which is capable of generating a plurality of quotient bits within a period of time substantially equal to the one taken to calculate a carry which would occur in case of full addition.

It is a further object of the present invention to provide a high speed dividing apparatus having a reduced number of gates necessary for adding and subtracting divisors.

In order to achieve the above objects, in accordance with the present invention, a first carry-save adder, a second carry-save adder and a half carry-save adder are arranged in a binary tree arrangement so that an output of the first carry save-adder is supplied to the second carry-save adder and the half carry-save adder. A carry look-ahead circuit calculates a full carry to be generated in summing the outputs of the first and second carry-save adders and a full carry to be generated in summing an output of the half carry-save adder and a 1's complement of the half-sum of the second carry-save adder. One of the branches of the binary tree adds a divisor and the other branch subtracts the divisor in parallel. One or the other of the next branches is selected in accordance with a quotient of each stage and a quotient output of the stage is determined by the selected second carry-save adder and half carry-save adder based on the output of the carry look-ahead circuit and the output of the carry look-ahead circuit of the preceding stage. A final stage output is selected in accordance with the quotient outputs of the respective stages and supplied to an input of the first carry-save adder. Thus, a multi-digit quotient is calculated in one cycle of operation.

In the present invention, the fact that the half-sum of the divisor subtraction (or addition) carried out in one branch is an inversion (1's complement) of a half-sum of the divisor addition (or subtraction) carried out in the other branch is utilized s that the halfsum calculated by one carry-save adder is inverted by an inverter to determine the half-sum to be calculated by the other half carry-save adder.

The above and other objects as well as the characteristics and advantages of the invention will become apparent from the following description of the preferred embodiment taken in conjuction with the accompanying drawings.

BRIEF DESCRIPTION OF THE DRAWINGS

FIG. 3 is a diagram showing the relation between the values of quotient bits and the inputs to the initial stage in the apparatus of FIG. 1; and FIG. 4 is a diagram showing the relation between the values of carry bits and the value of a quotient bit in the apparatus of FIG. 1.

DESCRIPTION OF THE PREFERRED EMBODIMENTS

Figure 1:
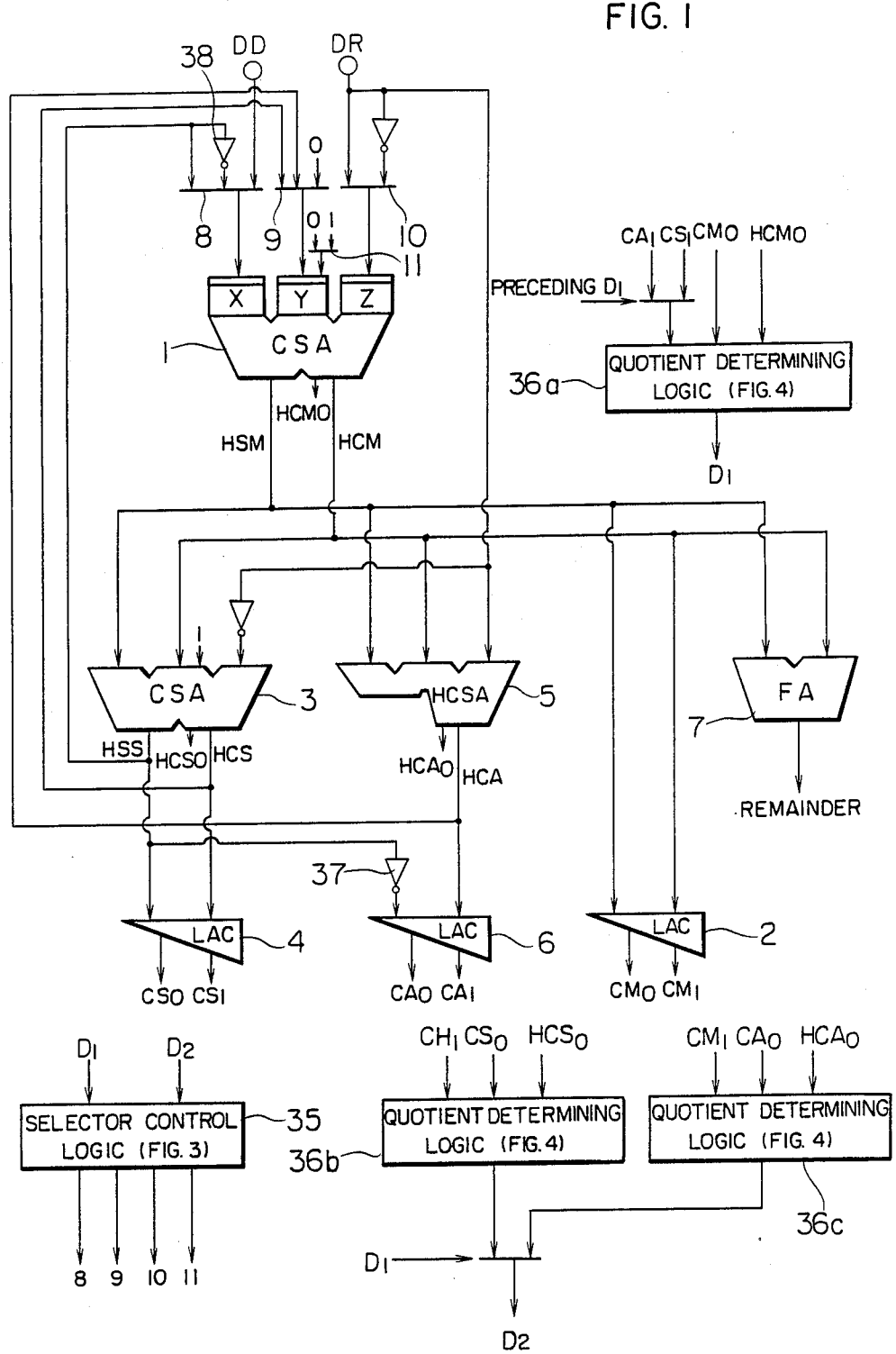
FIG. 1 is a block diagram of an embodiment of the present invention.

FIG. 1 shows an embodiment of the present invention which comprises a binary dividing apparatus having two stages connected in a tree, each stage including two carry-save adders and a half carry-save adder. The half carry-save adder is a simplified carry-save adder which outputs only a half-sum of two outputs, that is, the half-sum and a half-carry of a regular carry-save adder.

This apparatus is adapted to generate two quotient bits in one operation cycle, and has such an operational speed that four quotient bits can be generated within one cycle time of a conventional dividing apparatus using a full adder.

Referring to the drawing, reference symbols CSA 1, CSA 3, denote carry-save adders for binary data of desired number of bits (i.e. 64 bits). The reference symbol HCSA 5 denotes a half carry-save adder for binary data of the desired number of bits. The carry-save adder CSA 1 corresponds to the root of a binary tree, the carry-save adder CSA 3 to one branch of the binary tree, which is adapted to carry out the subtraction of a divisor, and the half carry-save adder HCSA 5 to the other branch of the binary tree, which is adapted to carry out the addition of a divisor. As is well known, a carry-save adder generates a half-sum, i.e. a sum determined with all carries ignored, and a half-carry, i.e. a carry occurring independently in respective significant bits.

A half-sum HSM and a half-carry HCM, the outputs from the carry-save adder CSA 1, are shifted one bit to the left and applied to two inputs of the carry-save adder CSA 3 and the half carry-save adder HCSA 5. A divisor (which will hereinafter be referred to simply as "DR") is applied to the remaining input of HCSA 5. As for inputs to CSA 3, the 1's complement of DR is applied to the remaining input, while the LSB (Least Significant Bit) of that input which receives the half carry-save HCM is set to "1". These measures are taken in order to form the 2's complement of DR for the subtraction of DR.

A half sum output HSS and a half-carry output HCS from CSA 3 as well as a half-carry output HCA from HCSA 5 are all shifted one bit to the left, and applied to selectors 8, 9 arranged in front of the inputs of CSA 1. Registers X, Y, Z are provided at the inputs of CSA 1. After every round through the loop the data are set in these registers.

Two carry-save adders are not arranged in the second stage but one carry-save adder and one half carry-save adder are arranged in order to reduce the number of gates required.

One of the carry-save adder can be replaced by the half carry-save adder by the following reason.

The half-sum of the carry-save adder is produced in the following manner.

$$HS_i = A_i \oplus B_i C_i$$

where $\oplus$ is an exclusive OR
$HS_i$ is a half-sum for i-th bit
$A_i$, $B_i$ and $C_i$ are input for i-th bit On the other hand, $$A_i \oplus B_i \oplus \overline{C_i} = \overline{HS_i}$$

where $\overline{C_i}$ and $\overline{HS_i}$ are 1's complements of $C_i$ and $HS_i$, respectively. When the circuit is constructed by complementary logic elements such a ECL (emitter coupled logic) which produce both inverted and non-inverted outputs, the half-sum output may be prepared by the carry-save adder of one of the branches and an inverted output of the half-sum may be used as the half-sum output in the other branch. As to the LSB, however, the half-sum outputs of the both branches are equal because "1" is set in the carry-save adder input of one branch because of the generation of 2's complement of DR.

Reference symbols LAC 2, LAC 4, LAC 6 denote carry look-ahead logics adapted to generate carries $CM_0$, $CS_0$, $CA_0$, respectively, to the MSB, and carries $CM_1$, $CS_1$, $CA_1$, respectively, to a position one bit lower than the MSB (which will hereinafter be referred to as the "NSB").

Those carries are ones which would be generated if the half-sum and the half-carry are full-added. The carry look-ahead logics LAC 2 and 4 are connected to the outputs of the carry-save adders CSA 1 and 3, respectively, and receive the half-sum and the half-carry, respectively. One input to the carry look-ahead logic 6 is an inversion of the half-sum of the carry-save adder CSA 3. The halfsum in the divisor addition which is to be calculated by the half carry-save adder HCSA 5 is substituted by the inversion of the half-sum in the divisor subtraction calculated by the carry-save adder CSA 3.

Reference symbol FA 7 denotes a full adder for calculating a remainder in the final step of the computation. It is adapted to receive the half-sum output and the half-carry output from carry-sav adder 1 without being shifted.

Selectors 8, 9, 10, 11 are provided for selecting input data to be supplied to CSA 1. The selector 8 is adapted to select the half-sum HSS from CSA 3, 1's complement of the half-sum $HS_i$, or a dividend (which will hereinafter be referred to simply as "DD").

The selector 8 receives the inversion of the half-sum HSS. Namely, the half-sum in the divisor addition which should be calculated by the half carry-save adder HCSA 5 is substituted by the inversion. The inverters 37 and 38 invert all bits of the half-sum HSS except for the LSB, because "1" is set in the LSB because of the generation of the 2's complement of DR in the divisor subtraction by the carry-save adder CSA 3.

The selector 9 is adapted to select the half-carry HCS from CSA 3, the half-carry HCA from HCSA 5, or a fixed value (0). The selector 10 is adapted to select DR or the 1's complement of DR. The selector 11 is adapted to select "0" or "1" as a value of the LSB of an input to the register Y according as DR or the 1's complement of DR is selected by the selector 10. This selection means the execution of the addition of DR or the subtraction (addition of the 2's complement) of DR. The selectors 8, 9 are adapted to be controlled in response to a quotient bit output from CSA 1 stage in the preceding operation cycle, and the selectors 10, 11 in response to a quotient bit output from CSA 3 stage or HCSA 5 stage in the preceding operation cycle. A control logic 35 for these selectors will be described in detail later. At the start of a dividing operation, however, the selectors 8, 9, 10, 11 select DD, a fixed value (0), the 1's complement of DR and a LSB value "1", respectively.

A quotient determining logic 36 is adapted to determine a quotient bit output from each stage, and the details of this logic will be described later.

In general, three inputs A, B, C, a half-sum output HS and a half-carry output HC of a carry-save adder, and a carry $C_0$ to the MSB and a carry $C_1$ to the NSB obtained from a carry look-ahead circuit have the following relation if each input consists of 64 bits.

$$A_0 A_1 \ldots A_{63}$$
$$B_0 B_1 \ldots B_{63}$$
$$\underline{C_0 C_1 \ldots C_{63}}$$
$$\overline{HS_0 HS_1 \ldots HS_{62} HS_{63}}$$
$$+) \; HC_0 HC_1 HC_2 \ldots HC_{63}$$
$$\overline{FS_0 FS_1 FS_2 \ldots FS_{63} FS_{64}}$$

$$C_0 \; C_1$$

where:

$$HS_i = A_i \oplus B_i \oplus C_i$$
$$HC_i = (A_i \cdot B_i) + (B_i \cdot C_i) + (C_i \cdot A_i)$$
$$i = 0, 1, 2, \ldots, 63$$

"⊕": exclusive OR
".": AND
"+": OR $$FS = \text{full sum of } HS \text{ and } HC$$
$$C_1 = HS_1 \cdot HC_2 +$$
$$(HS_1 + HC_2) \cdot HS_2 \cdot HC_3 +$$
$$(HS_1 + HC_2) \cdot (HS_2 + HC_3) \cdot HS_3 \cdot HC_4 + \ldots +$$
$$(HS_1 + HC_2) \cdot (HS_2 + HC_3) \ldots$$
$$(HS_{61} + HC_{62}) \cdot HS_{62} + HC_{63}$$
$$C_0 = HS_0 \cdot HC_1 +$$
$$(HS_0 + HC_1) \cdot C_1$$

It should further be noted that, since HC is a carry from each bit position and has the weight of $2_1$ with respect to HS, HC is shifted one bit to the left when HC and HS are subjected to full addition.

Since the half carry-save adder does not need a gate to operate $HS_i$, it can be constructed much simpler than the carry-save adder. According to the calculation by the inventors, the carry-save adder has seven gates per bit while the half carry-save adder need only three gates per bit.

Figure 2:
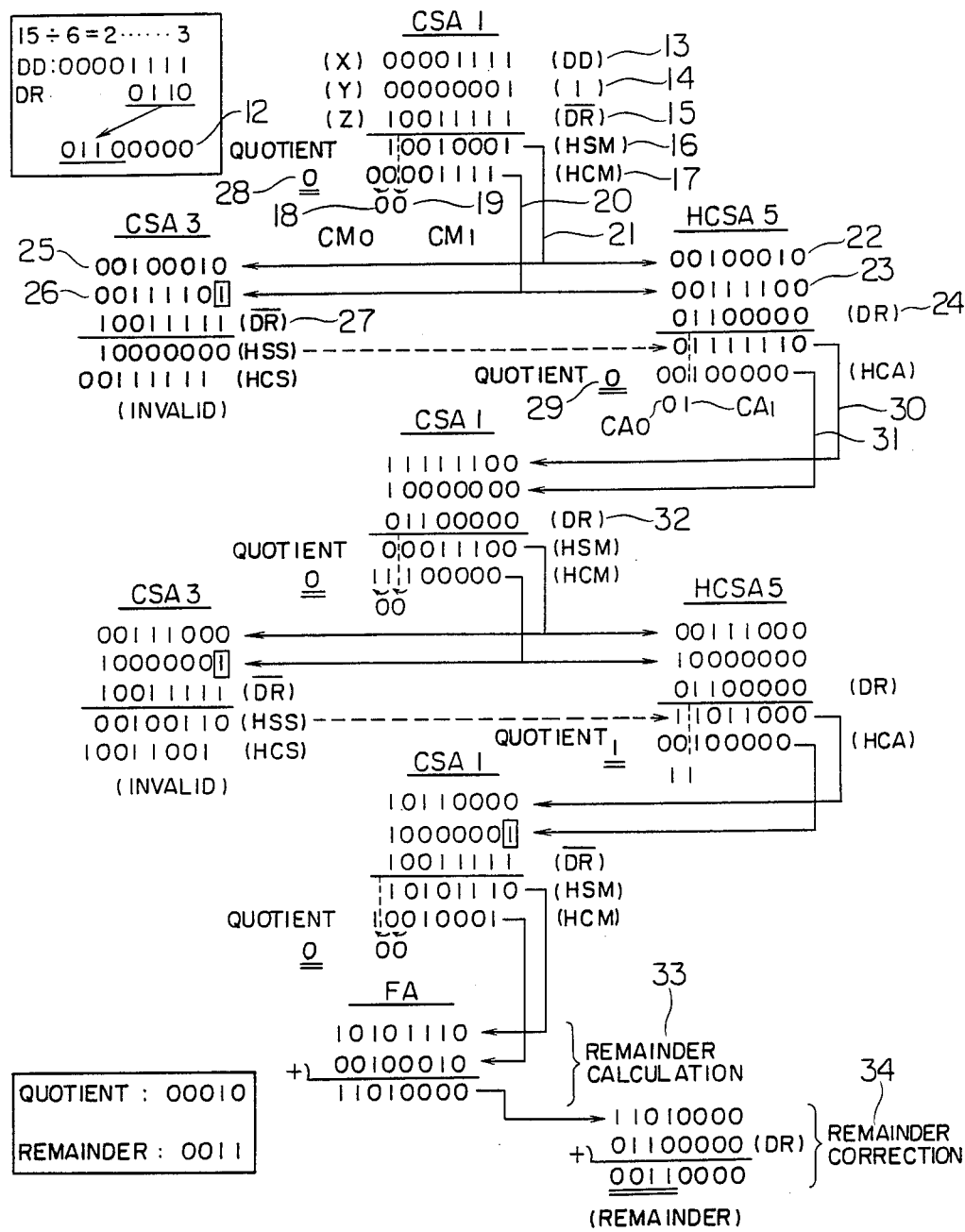
FIG. 2 illustrates an exemplifying dividing process carried out by the apparatus of FIG. 1.

The operation of the dividing apparatus shown in FIG. 1 will now be described with reference to FIG. 2 wherein the fixed point division of (00001111)÷(0110) is adopted as an example and the carry save adders are assumed to be 8-bit wide.

When the computation is started, DD 13, a fixed value (1) (a fixed value (0) from the selector 9 plus the LSB "1" from the selector 11) 14, and $\overline{DR}$ (the 1's complement of DR) 15 are supplied to the three inputs X, Y, Z of CSA 1, and DR is subtracted from DD. Prior to the subtraction, DR is shifted to a position corresponding to the upper half portion of DD as shown by reference numeral 12. This subtraction causes outputs HSM 16 and HCM 17 to be generated, and LAC logic 2 then generates a carry $CM_0$ 18 to the MSB and a carry $CM_1$ 19 to the NSB. During the determination of $CM_0$ 18 and $CM_1$ 19, HSM 16 and HCM 17 are shifted by one bit to the left and sent to both CSA 3 and HCSA 5 as shown by arrows 20, 21. In HCSA 5, which is supplied with DR 24 as well as HSM and HCM shifted to the left one bit 22, 23, the addition of DR takes place. On the other hand, in CSA 3, which receives HSM shifted to the left one bit 25, HCM shifted to the left one bit with its LSB set to "1" 26, and the 1's complement of DR 27, the subtraction of DR takes place.

The dividend (00001111) is represented by A, and the divisor (01100000) is represented by B. The carry-save adder CSA 1 calculates (A−B), the carry-save adder CSA 2 calculates $$\left\{ (A - B) - \frac{B}{2} \right\},$$

and the half carry-save adder HCSA 5 calculates $$\left\{ (A - B) + \frac{B}{2} \right\}.$$

In the meantime, the outputs of LAC 4 and LAC 6 are settled to complete the first operation cycle. At this point, a quotient bit 28 from the former stage, i.e. CSA 1 stage, is "0", and consequently a quotient bit from the addition branch is selected, in accordance with the non-restoring algorithm, as a quotient bit from the latter stage, hence a quotient bit 29, i.e. "0" from HCSA 5 stage.

If an oversubtraction occurs (quotient is zero) when the carry-save adder CSA 1 calculates (A−B), B is added again and B/2 is next subtracted. Since $$\left( A - \frac{B}{2} \right)$$

has already been calculated by the calculation of $$\left\{ (A - B) + \frac{B}{2} \right\}$$

by the half carry-save adder HCSA 5, the quotient from the stage of the half carry-save adder HCSA 5 is selected.

On the other hand, the carry-save adder CSA 3 calculates $$\left\{ (A - B) - \frac{B}{2} \right\}$$

but the quotient from this stage is thrown away because it is meaningless.

Thus, two quotient bits 28, 29 are determined. The logics 36a–c for determining quotient bits will be described in detail later.

In the second operation cycle, the selectors 8, 9, 10, 11 are controlled according to the values of quotient bits obtained in the first operation cycle. FIG. 3 shows the data selectively supplied to CSA 1 depending on the values of quotient bits. As shown in FIG. 3, if the quotient $D_1$ in the preceding stage in the previous operation is "0", $\overline{HSS}'$ which is the inversion of the half-sum HSS of the carry-save adder 3, shifted to the left by one bit, and HCA' which is the output HCA of the HCSA 5, shifted to the left by one bit, are supplied to the X and Y inputs of the carry-save adder CSA 1, and if the quotient $D_1$ is "1", HSS' which is the output HCA of the half carry-save adder 5, shifted to the left by one bit, and HCS' which is the output HCS shifted to the left by one bit are supplied to the X and Y inputs.

When the quotient bit $D_2$ from the latter stage in the preceding operation cycle is "0", DR is selected as Z input for the addition of DR. However, when $D_2$ is "1", the 1's complement of DR is selected as Z input, and "1" as the LSB of Y input, so that the 2's complement of DR is formed for the purpose of the subtraction of DR. The selector control logic 35 shown in FIG. 1 is adapted to control the selectors 8, 9, 10, 11 according to what is shown in FIG. 3. In the example shown in FIG. 2, as the quotient bits obtained in the first operation cycle is "00", $\overline{HSS}'$ and HCA' are selected as shown by arrows 30, 31, and DR as shown by reference numeral 32.

The operations of CSA 3 and HCSA 5 in the second operation cycle are similar to those in the first operation cycle.

In the second operation cycle, the carry-save adder CSA 1 calculates $$\left[\left(( A - B ) + \frac{B}{2}\right) + \frac{B}{4}\right],$$

the carry-save adder CSA 5 calculates $$\left[\left(\left(( A - B ) + \frac{B}{2}\right) + \frac{B}{4}\right) - \frac{B}{8}\right],$$

and the half carry-save adder HCSA 5 calculates $$\left[\left(\left(( A - B ) + \frac{B}{2}\right) + \frac{B}{4}\right) + \frac{B}{8}\right].$$

As a result, the quotient in the stage of the carry-save adder CSA 1 is 0 indicating that B/4 cannot be subtracted from A. Consequently, the quotient in the stage of the half carry-save adder HCSA 5 is selected. The quotient is 1 indicating that B/8 can be subtracted from A.

Subsequently, operations similar to those in the second operation cycle are repeated till a predetermined number (two in the example of FIG. 2) of rounds through the loop are completed, when, in conclusion, the full addition of HSM and HCM obtained from CSA 1 is carried out by the full adder FA 7 to calculate the remainder as shown by reference numeral 33.

It should be added that the division is carried out in this dividing apparatus in accordance with the nonrestoring algorithm, and therefore, when the LSB of the quotient obtained is "0", the remainder must be corrected by further adding DR to the full sum of HSM and HCM. In the example shown in FIG. 2, the LSB of the quotient obtained from CSA1 stage after the operation is carried out round the loop twice is "0". Accordingly, the correction of the remainder is carried out as shown by reference numeral 34. This correction is done by a suitable full adder (not shown). Alternatively, FA 7 may be utilized for the correction of the remainder by switching its inputs.

The determination of a quotient bit will now be described. This dividing apparatus operates essentially in accordance with the non-restoring algorithm. Accordingly, the determination of each quotient bit must be done according as the result of each subtraction or addition is positive or negative, in other words, whether a carry from the MSB position occurs or not during a normal full addition. However, for this dividing apparatus, in addition to a normal carry in the operating stage, the MSB of a half-carry in the operating stage and a carry to the NSB occurring during the full addition of a half-sum and half-carry in the preceding stage must be taken into account. The reason is that a carry which would have propagated and been shifted out if a full addition had been executed is contained latently in a half-sum and half-carry sent from the preceding stage. Since such a latent carry can occur, it is necessary to judge whether a carry generated in the operating stage is one reflecting a true quotient bit or no other than a latent carry from the preceding stage being revealed.

FIG. 4 shows a quotient bit determining logic. A carry "1" to the NSB generated during the full addition of a half-sum and half-carry in the preceding stage (obtained from the carry look-ahead logic) indicates the existence of a latent carry. Let $C_0^*$ and $HC_0^*$ (* indicates the carry or bit derived from that stage) respectively represent a carry to the MSB during the full addition of a half-sum and half-carry (namely, the MSB of an output from the carry look-ahead logic) and the MSB of a half-carry in the operating stage, and $C_1$ a carry to the NSB during the full addition of a half-sum and half-carry in the preceding stage (namely, a bit subsequent to the MSB of an output from the carry look-ahead logic). If $C_1 = 0$, then either $C_0^*$ or $HC_0^*$ is a carry which reflects a quotient bit. However, it is impossible that both $C_0^*$ and $HC_0^*$ are "1" in the operating stage when $C_1 = 0$, and consequently there is no case of $[C_0^* = 1 \& HC_0^* = 1]$ when $C_1 = 0$. On the other hand, it is only when $[C_0^* = 1 \& HC_0^* = 0]$ or when $[C_0^* = 0 \& HC_0^* = 1]$ that a latent carry alone occurs when $C_1 = 1$. In the former case, a carry is transmitted still in a latent state from the operating stage to the succeeding stage, and, in the latter case, a latent carry reveals itself in the operating stage. Further, if $C_1 = 1$ and $[C_0^* = 1 \& HC_0^* = 1]$, it indicates that both a latent carry from the preceding stage and a quotient-reflecting carry occur. However, it is impossible that no carries occur at all in the operating stage when $C_1 = 1$. Accordingly, there is no possibility of $[C_0^* = 0 \& HC_0^* = 0]$ when $C_1 = 1$. The above may be summarized that a quotient bit D in the operating stage can be expressed by the equation, $$D = \overline{C_1} \cdot (C_0^* + HC_0^*) + C_1 \cdot C_0^* \cdot HC_0^*$$

The quotient determining logic 36 a-c shown in FIG. 1 is adapted to determine quotient bit outputs from respective stages ($D_1$ and $D_2$ in FIG. 3) in accordance with the relation shown in FIG. 4 or the equation shown above.

The quotient determining circuit 36a receives the carry $CA_1$ or $CS_1$ to the NSB in the full-addition in the preceding stage, the carry $CM_0$ to the MSB in the full-addition in that stage and $HCM_0$ which is the MSB of the HC in that stage, and determines the quotient in accordance with the relationship of FIG. 4. The $CA_1$ or $CS_1$ is selected in accordance with the quotient $D_1$ determined in the previous operation cycle. When $D_1$ is "0", $CS_1$ is selected, and when $D_1$ is "1", $CA_1$ is selected.

The quotient determining circuits 36b and 36c receive the carry $CM_1$ to the NSB in the full addition in the preceding stage, the carries $CS_0$ and $CA_0$ to the MSB in the full addition in that stage and HCS and $HCA_0$ which are MSB's of the HC in that stage, and determine the quotients in accordance with the relationship of FIG. 4. One of the quotients determined by the quotient determining circuits 36b and 36c is selected in accordance with the quotient $D_1$ in the preceding stage and outputted as the quotient $D_2$. When the quotient $D_1$ is "0", the quotient of the quotient determining circuit 36c is selected, and when the quotient $D_1$ is "1", the quotient of the quotient determining circuit 36b is selected.

As is clear from the above description, according to the present invention it is unnecessary to carry out a full addition actually for determining a quotient, but it is only necessary to determine a carry which would occur in case of full addition. The carry save adder can be formed in a single-stage logic, so that the greater part of the operation time is spent in determining a carry in the carry look-ahead logic. Let the time required for carrying out a normal full addition be one cycle time. It is possible that a bare carry is determined within half a cycle time. If a binary tree configuration is employed as taught by the present invention, the starting of the operations of LAC 6 and LAC 4 in the latter stage is delayed with respect to that of LAC2 in the former stage by only the operation time of CSA 1. Accordingly, all outputs from LAC 6, LAC 4 can be obtained in a period of time substantially equal to one operation time of a carry look-ahead logic. That is, two quotient bits can be obtained within half a cycle time for a conventional dividing apparatus using a full adder. Thus, a dividing apparatus capable of determining four quotient bits within one cycle time can be formed, which enables a division operation to be carried out within a time which is a half of that required by the dividing apparatus of the aforementioned Japanese Patent Examined Publication No. 44-17188.

The above-described embodiment has the simplest construction, i.e. a 2-stage construction. It can be expanded easily into a 3-stage construction by connecting the respective outputs of CSA 3 and HCSA 5 to other carry-save adder and half carry-save adder. The resultant apparatus is capable of obtaining 3 quotient bits in one cycle thereof. This means that this apparatus enables 6 quotient bits to be obtained within one cycle time of a conventional dividing apparatus using a full adder. If the binary tree structure is further expanded successively in the same manner, a dividing apparatus capable of generating more quotient bits in one cycle can be obtained.

In accordance with the present invention, since the carry-save adder in one of the branches may be the half carry-save adder, the number of gates in the dividing apparatus can be reduced.

Further, the dividing apparatus according to the present invention described above is capable of obtaining a plurality of quotient bits within a period of time which is required for determining only a carry which would occur in case of full addition. Moreover, this apparatus does not require any pre-processing operation, such as a normalization operation and an operation for producing multiples of a divisor. Therefore, a high-speed division is attained without a noticeable increase in either the complexity of control or the amount of hardware.

We claim:

1. A dividing apparatus comprising:
   a first carry-save adder for carrying out divisor addition and divisor subtraction to generate a first half-sum and a first half-carry;
   a second carry-save adder for receiving the first half-sum and the first half-carry and carrying out one of divisor addition and divisor subtraction to generate a second half-sum or a second half-carry;
   a half carry-save adder for receiving the first half-sum and the first half-carry and carrying out another operation to that of said second carry-save adder to generate a third half-carry;
   an inverter for receiving the second half-sum and inverting the second half-sum to generate a third half-sum;
   a plurality of carry look-ahead circuits each connected to said first and second carry-save adders and said half carry-save adder for receiving a pair of the first, second or third half-sum and a half-carry to generate a carry when the received half-sum and half-carry are full-added;
   a quotient determining circuit for determining first and second quotient bits, including means for determining the first quotient bits based on the first half-carry and a carry from the carry look-ahead circuit connected to said first carry-save adder, and means for determining the second quotient bits based on the second and third half-carries and carries from said plurality of carry look-ahead circuits; and
   a selection circuit for selecting one of pairs of the second and third half-carries and a half-sum based on the first and second quotients and selecting the divisor or inversion thereof to supply the selected divisor or inversion thereof to said first carry-save adder.

2. A dividing apparatus as claimed in claim 1 wherein said quotient determining means operates in response to the most significant bit of a half carry from the carry save adder in each stage, a carry to the most significant bit obtained from the carry look-ahead circuit in the same stage, and a carry to a bit next to the most significant bit obtained from the carry look-ahead circuit in its preceding stage.

3. A dividing apparatus as claimed in claim 1 wherein said selection circuit is adapted to supply a dividend and the complement of said divisor to the inputs of the carry-save adder at the root of a binary tree when a dividing operation starts.

4. A dividing apparatus as claimed in claim 1 wherein said apparatus further includes a full adder for calculating a remainder.

5. A dividing apparatus according to claim 1 wherein said half carry-save adder comprises complementary logic elements.

* * * * *